(12) United States Patent
Yao et al.

(10) Patent No.: US 11,334,744 B2
(45) Date of Patent: May 17, 2022

(54) THREE-DIMENSIONAL POINT CLOUD LABEL LEARNING DEVICE, THREE-DIMENSIONAL POINT CLOUD LABEL ESTIMATING DEVICE, THREE-DIMENSIONAL POINT CLOUD LABEL LEARNING METHOD, THREE-DIMENSIONAL POINT CLOUD LABEL ESTIMATING METHOD, AND PROGRAM

(71) Applicant: NIPPON TELEGRAPH AND TELEPHONE CORPORATION, Tokyo (JP)

(72) Inventors: Yasuhiro Yao, Tokyo (JP); Hitoshi Niigaki, Tokyo (JP); Ken Tsutsuguchi, Tokyo (JP); Tetsuya Kinebuchi, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 31 days.

(21) Appl. No.: 17/048,083

(22) PCT Filed: Apr. 16, 2019

(86) PCT No.: PCT/JP2019/016326
§ 371 (c)(1),
(2) Date: Oct. 15, 2020

(87) PCT Pub. No.: WO2019/203231
PCT Pub. Date: Oct. 24, 2019

(65) Prior Publication Data
US 2021/0158016 A1     May 27, 2021

(30) Foreign Application Priority Data
Apr. 17, 2018   (JP) .............................. JP2018-079243

(51) Int. Cl.
*G06K 9/00*   (2022.01)
*G06T 7/11*   (2017.01)
*G06K 9/62*   (2022.01)

(52) U.S. Cl.
CPC ......... *G06K 9/00201* (2013.01); *G06K 9/622* (2013.01); *G06T 7/11* (2017.01);
(Continued)

(58) Field of Classification Search
CPC .. G06K 9/00201; G06K 9/4652; G06K 9/622; G06K 9/6232; G06K 9/6271;
(Continued)

(56) References Cited

U.S. PATENT DOCUMENTS

2020/0043221 A1* 2/2020 Kaufman ............. G06K 9/6248
2021/0407117 A1* 12/2021 Guizilini ................. G06T 17/10

FOREIGN PATENT DOCUMENTS

JP   2016118502   6/2016

OTHER PUBLICATIONS

Qi, Charles R., et al., "PointNet: Deep Learning on Point Sets for 3D Classification and Segmentation," arXiv:1612.00593v2 [cs.CV] Apr. 10, 2017.

* cited by examiner

*Primary Examiner* — Bobbak Safaipour

(57) ABSTRACT

A large-scale point cloud having no limitation on the range or the number of points is set as an object, and labels are attached to the points constituting the object regardless of the type of object.
A three-dimensional point cloud label learning apparatus 10A includes a ground-based height calculation unit that receives a three-dimensional point cloud and a ground surface height as inputs and outputs a three-dimensional point cloud with a ground-based height, an intensity-RGB point cloud with a ground-based height, an intensity-RGB
(Continued)

conversion unit that receives the three-dimensional point cloud with the ground-based height as an input and outputs an intensity-RGB converted three-dimensional point cloud with the ground-based height, a supervoxel clustering unit that receives the intensity-RGB converted three-dimensional point cloud with the ground-based height, a point cloud label for learning, and a clustering hyperparameter as inputs and outputs supervoxel data with a correct answer label, and a deep neural network learning unit that receives the supervoxel data with the correct answer label and a deep neural network hyperparameter as inputs and outputs a learned deep neural network parameter.

20 Claims, 10 Drawing Sheets

(52) U.S. Cl.
CPC ............... *G06T 2207/10028* (2013.01); *G06T 2207/20081* (2013.01); *G06T 2207/20084* (2013.01)

(58) Field of Classification Search
CPC . G06T 2207/10028; G06T 2207/20081; G06T 2207/20084; G06T 7/11; G06T 7/00
See application file for complete search history.

THREE-DIMENSIONAL POINT CLOUD LABEL LEARNING DEVICE, THREE-DIMENSIONAL POINT CLOUD LABEL ESTIMATING DEVICE, THREE-DIMENSIONAL POINT CLOUD LABEL LEARNING METHOD, THREE-DIMENSIONAL POINT CLOUD LABEL ESTIMATING METHOD, AND PROGRAM

CROSS-REFERENCE TO RELATED APPLICATIONS

This application is a U.S. 371 Application of International Patent Application No. PCT/JP2019/016326, filed on 16 Apr. 2019, which application claims priority to and the benefit of JP Application No. 2018-079243, filed on 17 Apr. 2018, the disclosures of which are hereby incorporated herein by reference in their entireties.

TECHNICAL FIELD

The present disclosure relates to a three-dimensional point cloud label learning apparatus, a three-dimensional point cloud label estimating apparatus, a three-dimensional point cloud label learning method, a three-dimensional point cloud label estimating method, and a program.

BACKGROUND ART

Data having three-dimensional (x, y, z) position information and an arbitrary number of attribute information is called a three-dimensional point. Data constituted by such a collection of three-dimensional points is called a three-dimensional point cloud. The three-dimensional point cloud is data indicating geometric information of an object, and can be acquired by performing three-dimensional reconstruction from a line sensor or an image. The attribute information of a point is information other than the position information obtained at the time of measuring the point cloud, and includes, for example, an intensity value indicating a reflection intensity of the point, RGB values indicating color information.

As technology for estimating a label of the three-dimensional point cloud, for example, as described in Non Patent Literature 1, there is a method using a Deep Neural Network (DNN). Further, for example, Patent Literature 1 discloses technology for assigning a label to an artificial object in a large-scale point cloud outdoors by detecting the cross-sectional shape of a sweeping shape.

CITATION LIST

Non Patent Literature

Non Patent Literature 1: R. Q. Charles, H. Su, M. Kaichun and L. J. Guibas, "PointNet: Deep Learning on Point Sets for 3D Classification and Segmentation", 2017 IEEE Conference on Computer Vision and Pattern Recognition (CVPR), Honolulu, Hi., 2017, pp. 77-85.

PATENT LITERATURE

Patent Literature 1: JP-2016-118502 A

SUMMARY OF THE INVENTION

Technical Problem

However, in the method described in Non Patent Literature 1, learning and estimating are performed by limiting the number of points included in an input point cloud, so that it is difficult to handle a large-scale point cloud having an unlimited range.

Further, with the technology described in Patent Literature 1, it is difficult to assign a label to a natural object (tree leaf or the like) that does not form a sweeping shape.

The present disclosure has been made in view of the above points, and a purpose of the present disclosure is to provide a three-dimensional point cloud label learning apparatus, a three-dimensional point cloud label estimating apparatus, a three-dimensional point cloud label learning method, a three-dimensional point cloud label estimating method, and a program in which a large-scale point cloud having no limitation on the range or the number of points can be set as an object, and labels can be attached to the points constituting the object regardless of the type of the object.

Means for Solving the Problem

To achieve the above object, a three-dimensional point cloud label learning apparatus according to a first aspect of the disclosure includes: a ground-based height calculation unit that calculates, when a three-dimensional point cloud, which includes a three-dimensional position at a point and an intensity value indicating a reflection intensity at the point, and a ground surface height are input, a ground-based height at the point of the three-dimensional point cloud and outputs a three-dimensional point cloud with the ground-based height to which the ground-based height calculated is assigned; an intensity-RGB conversion unit that receives the three-dimensional point cloud with the ground-based height as an input and, for the point of the three-dimensional point cloud with the ground-based height, and outputs an intensity-RGB converted three-dimensional point cloud with the ground-based height which is obtained by converting the intensity value into RGB values indicating color information; a supervoxel clustering unit that receives the intensity-RGB converted three-dimensional point cloud with the ground-based height, a point cloud label for learning including a label assigned in advance for the point of the three-dimensional point cloud, and a clustering hyperparameter as inputs, clusters the intensity-RGB converted three-dimensional point cloud with the ground-based height into a plurality of supervoxels by using the three-dimensional position and the RGB values, and outputs supervoxel data with a correct answer label indicating a three-dimensional position and an attribute of an individual point of a component of the supervoxel, and a center position and an attribute of the supervoxel for each of the supervoxels; and a deep neural network learning unit that receives the supervoxel data with the correct answer label and a deep neural network hyperparameter as inputs, and for each of the supervoxels, learns a learned deep neural network parameter of a deep neural network for estimating the label by using the supervoxel data indicating the three-dimensional position and the attribute of the individual point of the component of the supervoxel, and the center position and the attribute of the supervoxel.

A three-dimensional point cloud label learning apparatus according to a second aspect of the disclosure includes: a supervoxel clustering unit that receives a three-dimensional point cloud, which includes a three-dimensional position including a ground-based height at a point and an intensity value indicating a reflection intensity at the point or RGB values indicating color information, a point cloud label for learning including a label assigned in advance for the point of the three-dimensional point cloud, and a clustering hyperparameter as inputs, clusters the three-dimensional point cloud into a plurality of supervoxels by using the three-dimensional position, and outputs supervoxel data with a correct answer label indicating a three-dimensional position and an attribute of an individual point of a component of the supervoxel, and a center position and an attribute of the supervoxel for each of the supervoxels; and a deep neural network learning unit that receives the supervoxel data with the correct answer label and a deep neural network hyperparameter as inputs, and for each of the supervoxels, learns a learned deep neural network parameter of a deep neural network for estimating the label by using the supervoxel data indicating the three-dimensional position and the attribute of the individual point of the component of the supervoxel, and the center position and the attribute of the supervoxel.

On the other hand, to achieve the above object, a three-dimensional point cloud label estimating apparatus according to a third aspect of the disclosure includes: a ground-based height calculation unit that calculates, when a three-dimensional point cloud, which includes a three-dimensional position at a point and an intensity value indicating a reflection intensity at the point, and a ground surface height are input, a ground-based height at the point of the three-dimensional point cloud and outputs a three-dimensional point cloud with the ground-based height to which the calculated ground-based height is assigned; an intensity-RGB conversion unit that receives the three-dimensional point cloud with the ground-based height as an input and, for the point of the three-dimensional point cloud with the ground-based height, outputs an intensity-RGB converted three-dimensional point cloud with the ground-based height which is obtained by converting the intensity value into RGB values indicating color information; a supervoxel clustering unit that receives the intensity-RGB converted three-dimensional point cloud with the ground-based height and a clustering hyperparameter as inputs, clusters the intensity-RGB converted three-dimensional point cloud with the ground-based height into a plurality of supervoxels by using the three-dimensional position and the RGB values, and outputs supervoxel data indicating a three-dimensional position and an attribute of an individual point of a component of the supervoxel, and a center position and an attribute of the supervoxel for each of the supervoxels; and a deep neural network estimating unit that receives the supervoxel data, a deep neural network hyperparameter, and a learned deep neural network parameter of a deep neural network that is pre-learned for estimating a label using the supervoxel data indicating the three-dimensional position and the attribute of an individual point of the component of the supervoxel, and the center position and the attribute of the supervoxel for each of the supervoxels as inputs, derives an estimated label for each of the supervoxels by using the deep neural network, and outputs a three-dimensional point cloud with an estimated label to which the derived estimated label is assigned.

A three-dimensional point cloud label estimating apparatus according to a fourth aspect of the disclosure includes: a supervoxel clustering unit that receives a three-dimensional point cloud, which includes a three-dimensional position including a ground-based height at a point and an intensity value indicating a reflection intensity at the point or RGB values indicating color information and a clustering hyperparameter as inputs, clusters the three-dimensional point cloud into a plurality of supervoxels by using the three-dimensional position, and output supervoxel data indicating a three-dimensional position and an attribute of an individual point of a component of the supervoxel, and a center position and an attribute of the supervoxel for each of the supervoxels; and a deep neural network estimating unit that receives the supervoxel data, a deep neural network hyperparameter, and a learned deep neural network parameter of a deep neural network that is pre-learned for estimating a label using the supervoxel data indicating the three-dimensional position and the attribute of an individual point of the component of the supervoxel, and the center position and the attribute of the supervoxel for each of the supervoxels as inputs, derives an estimated label for each of the supervoxels by using the deep neural network, and outputs a three-dimensional point cloud with an estimated label to which the derived estimated label is assigned.

On the other hand, to achieve the above object, a three-dimensional point cloud label learning method according to a fifth aspect of the disclosure includes: calculating, when a three-dimensional point cloud, which includes a three-dimensional position at a point and an intensity value indicating a reflection intensity at the point, and a ground surface height are input, a ground-based height at the point of the three-dimensional point cloud and outputting a three-dimensional point cloud with the ground-based height to which the calculated ground-based height is assigned by a ground-based height calculation unit; receiving the three-dimensional point cloud with the ground-based height as an input and, for the point of the three-dimensional point cloud with the ground-based height attached, outputting an intensity-RGB converted three-dimensional point cloud with the ground-based height which is obtained by converting the intensity value into RGB values indicating color information by an Intensity-RGB conversion unit; receiving the intensity-RGB converted three-dimensional point cloud with the ground-based height, a point cloud label for learning including a label assigned in advance for the point of the three-dimensional point cloud, and a clustering hyperparameter as inputs, clustering the intensity-RGB converted three-dimensional point cloud with the ground-based height into a plurality of supervoxels by using the three-dimensional position and the RGB values, and outputting supervoxel data with a correct answer label indicating a three-dimensional position and an attribute of an individual point of a component of the supervoxel, and a center position and an attribute of the supervoxel by a supervoxel clustering unit for each of the supervoxels; and receiving the supervoxel data with the correct answer label and a deep neural network hyperparameter as inputs, and for each of the supervoxels, learning a learned deep neural network parameter of a deep neural network for estimating the label by a deep neural network learning unit by using the supervoxel data indicating the three-dimensional position and the attribute of the individual point of the component of the supervoxel, and the center position and the attribute of the supervoxel.

On the other hand, to achieve the above object, a three-dimensional point cloud label estimating method according to a sixth aspect of the disclosure includes: calculating, when a three-dimensional point cloud, which includes a three-dimensional position at an point and an intensity value indicating a reflection intensity at the point, and a ground surface height are input, a ground-based height at the point of the three-dimensional point cloud and outputting a three-dimensional point cloud with the ground-based height to which the calculated ground-based height is assigned by a ground-based height calculation unit; receiving the three-dimensional point cloud with the ground-based height as an input and, for the point of the three-dimensional point cloud with the ground-based height, outputting an intensity-RGB converted three-dimensional point cloud with the ground-based height which is obtained by converting the intensity value into RGB values indicating color information by an intensity-RGB conversion unit; receiving the intensity-RGB converted three-dimensional point cloud with the ground-based height and a clustering hyperparameter as inputs, clustering the intensity-RGB converted three-dimensional point cloud with the ground-based height into a plurality of supervoxels by using the three-dimensional position and the RGB values, and outputting supervoxel data indicating a three-dimensional position and an attribute of an individual point of a component of the supervoxel, and a center position and an attribute of the supervoxel by a supervoxel clustering unit for each of the supervoxels; and receiving the supervoxel data, a deep neural network hyperparameter, and a learned deep neural network parameter of a deep neural network that is pre-learned for estimating a label using the supervoxel data indicating the three-dimensional position and the attribute of the individual point of the component of the supervoxel, and the center position and the attribute of the supervoxel for each of the supervoxels as inputs, deriving an estimated label for each of the supervoxels by using the deep neural network, and outputting a three-dimensional point cloud with an estimated label to which the derived estimated label is assigned by a deep neural network estimating unit.

Furthermore, in order to achieve the above object, a program according to a seventh aspect of the disclosure causes a computer to function as each unit included in the three-dimensional point cloud label learning apparatus according to the first or second aspect of the disclosure, or to function as each unit included in the three-dimensional point cloud label estimating apparatus according to the fourth or fifth aspect of the disclosure.

Effects of the Invention

As described above, according to a three-dimensional point cloud label learning apparatus, a three-dimensional point cloud label estimating apparatus, the three-dimensional point cloud label learning method, a three-dimensional point cloud label estimating method, and a program of the present disclosure, a large-scale point cloud having no limitation on the range or the number of points can be set as an object, and labels can be attached to the points constituting the object regardless of the type of the object (such as artificial or natural objects).

Further, by using attribute information (intensity, RGB, or the like) for learning and estimating, it is possible to perform an estimation with higher accuracy than when only position information is used.

DESCRIPTION OF EMBODIMENTS

Hereinafter, an example of an embodiment for performing the present disclosure will be described in detail with reference to the drawings.

The three-dimensional point cloud label estimating apparatus according to the present embodiment receives the above-described three-dimensional point cloud as an input and estimates a label of each of the points using position information and attribute information at each point included in the three-dimensional point cloud. Further, the three-dimensional point cloud label learning apparatus according to the present embodiment performs learning for implementing a label estimating function of the three-dimensional point cloud label estimating apparatus. The three-dimensional point cloud label learning apparatus and the three-dimensional point cloud label estimating apparatus according to the present embodiment are embodied by one three-dimensional point cloud label learning/estimating apparatus described later.

As described above, the attribute information of the point includes an intensity value indicating the reflection intensity of the point, RGB values indicating the color information, but is not limited in the present embodiment. The label indicates what kind of object each point belongs to. For example, a point cloud as a result of an urban region measurement includes a label indicating a building, a road, a tree, or a sign as an example. The type of label can be arbitrarily set by a user, and is not limited in the present embodiment.

In the present embodiment, a large-scale point cloud having no limitation on the number of points constituting the point cloud or the spatial range of the point cloud is set as an object. For example, a point cloud as a result of an urban region measurement can increase the number of points constituting the point cloud and the spatial range of the point without limit if the area of the range to be measured is increased. In the present embodiment, such a large-scale point cloud is set as an object.

Figure 1:
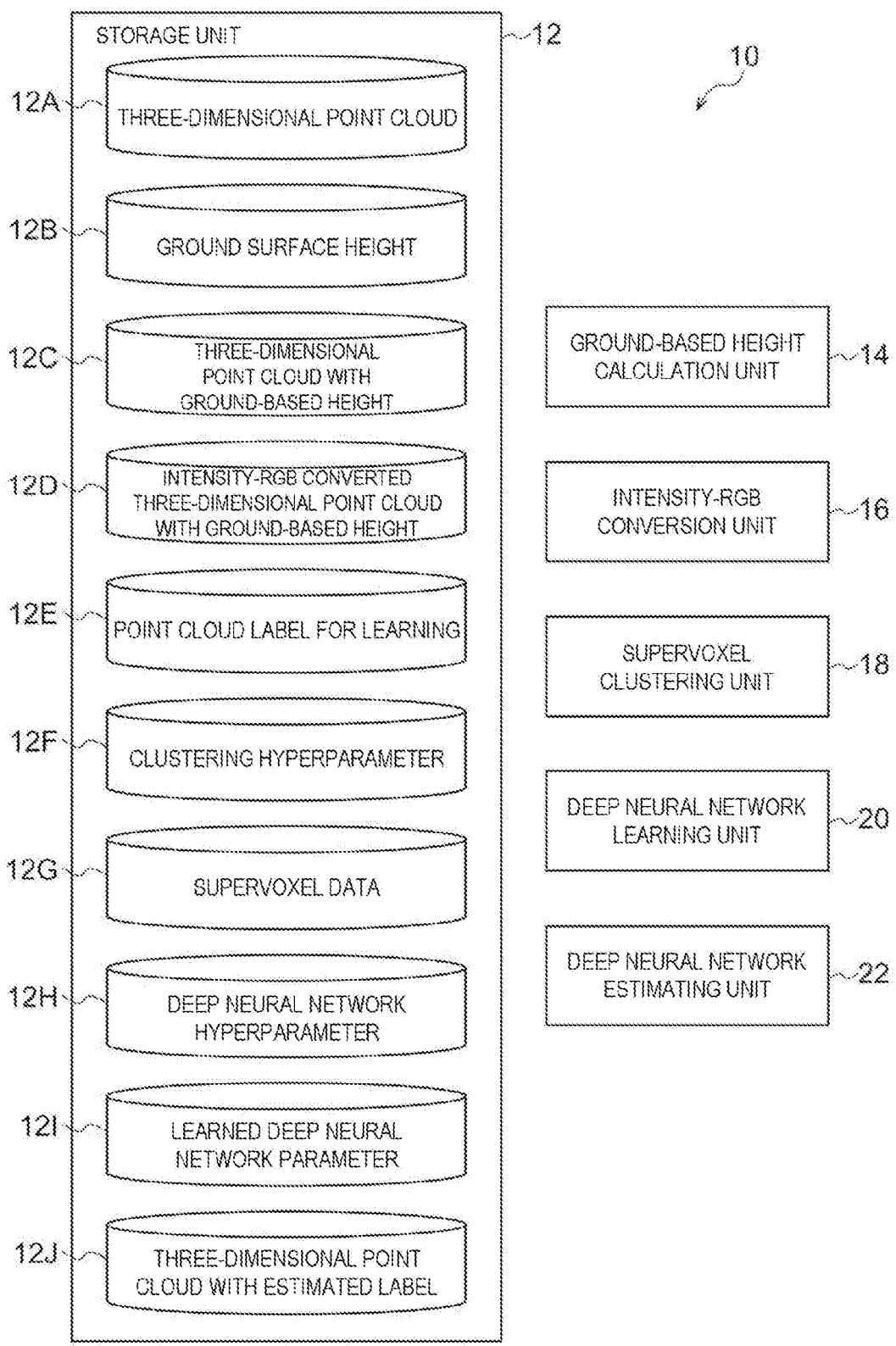
FIG. 1 is a block diagram illustrating an example of a functional configuration of a three-dimensional point cloud label learning/estimating apparatus according to an embodiment.

Configuration of Three-Dimensional Point Cloud Label learning/estimating Apparatus FIG. 1 is a block diagram illustrating an example of a functional configuration of a three-dimensional point cloud label learning/estimating apparatus 10 according to the present embodiment.

As illustrated in FIG. 1, the three-dimensional point cloud label learning/estimating apparatus 10 according to the present embodiment includes a storage unit 12, a ground-based height calculation unit 14, an intensity-RGB conversion unit 16, a supervoxel clustering unit 18, a deep neural network learning unit 20, and a deep neural network estimating unit 22.

The three-dimensional point cloud label learning/estimating apparatus 10 is electrically configured as a computer including a central processing unit (CPU), random access memory (RAM), and read only memory (ROM), and the like. Note that the three-dimensional point cloud label learning/estimating apparatus 10 may include a graphics processing unit (GPU). The ROM stores a three-dimensional point cloud label learning/estimating processing program according to the present embodiment. The three-dimensional point cloud label learning/estimating processing program executes an estimating processing routine or a learning processing routine described later.

The above-described three-dimensional point cloud label learning/estimating processing program may be installed in advance in the three-dimensional point cloud label learning/estimating apparatus 10, for example. The three-dimensional point cloud label learning/estimating processing program may be functioned by being stored in a non-volatile storage medium or distributed via a network and appropriately installed in the three-dimensional point cloud label learning/estimating apparatus 10. Note that examples of the non-volatile storage medium include a compact disc read only memory (CD-ROM), a magneto-optical disk, a digital versatile disc read only memory (DVD-ROM), a flash memory, and a memory card.

The CPU reads and executes the three-dimensional point cloud label learning/estimating processing program stored in the ROM, and thus functions as the ground-based height calculation unit 14, the intensity-RGB conversion unit 16, the supervoxel clustering unit 18, the deep neural network learning unit 20, and the deep neural network estimating unit 22.

Further, a nonvolatile storage apparatus is applied to the storage unit 12. The storage unit 12 stores a three-dimensional point cloud 12A, a ground surface height 12B, a three-dimensional point cloud with a ground-based height 12C, an intensity-RGB converted three-dimensional point cloud with a ground-based height 12D, a point cloud label for learning 12E, a clustering hyperparameter 12F, supervoxel data 12G (supervoxel data with a correct answer label at the time of learning), a deep neural network hyperparameter 12H, a learned deep neural network parameter 12I, and a three-dimensional point cloud with an estimated label 12J.

The three-dimensional point cloud label learning/estimating apparatus 10 according to the present embodiment functions as a three-dimensional point cloud label learning apparatus during learning, and functions as a three-dimensional point cloud label estimating apparatus during estimation.

Figure 2:
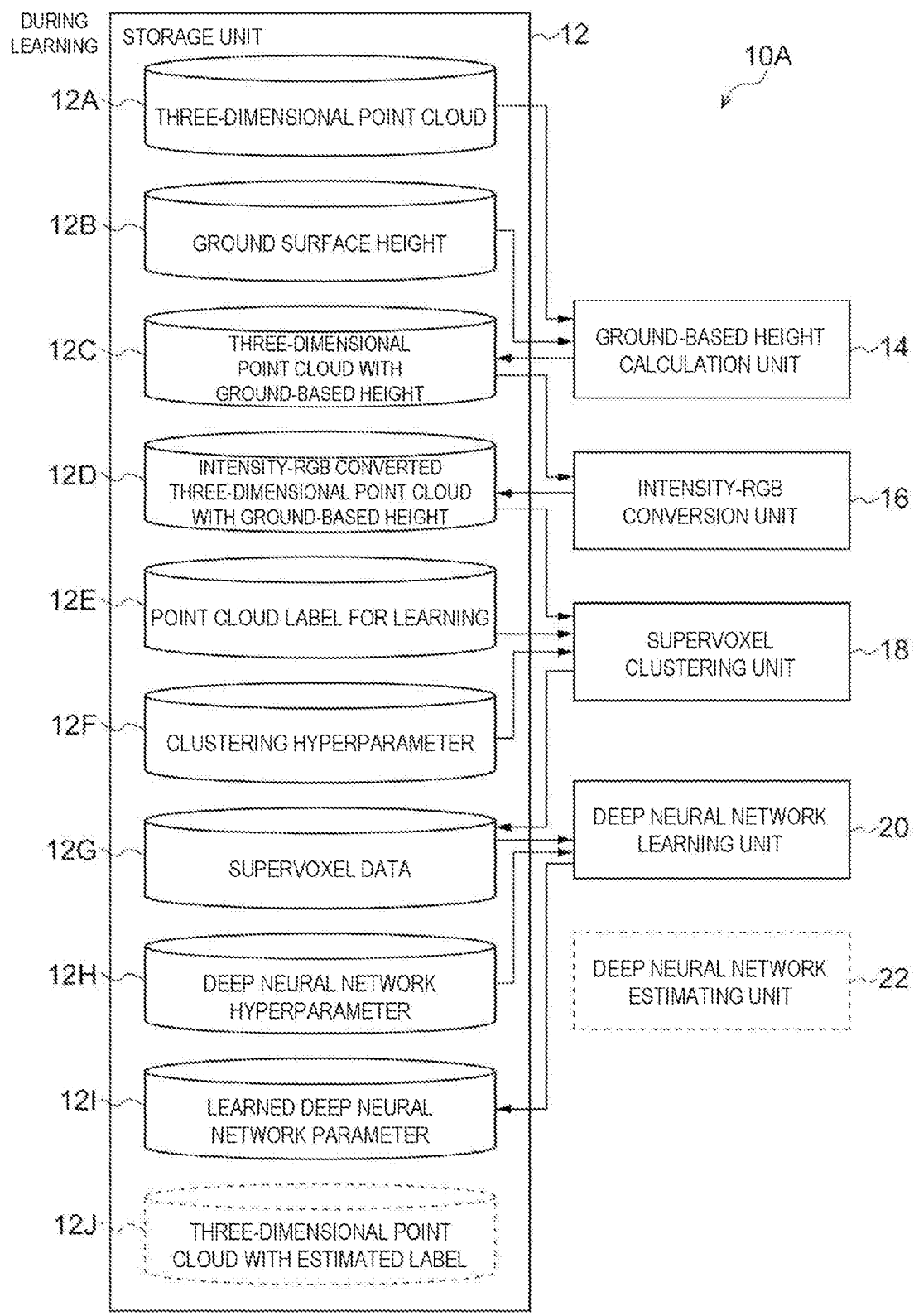
FIG. 2 is a block diagram illustrating an example of a functional configuration of a three-dimensional point cloud label learning apparatus according to the embodiment.

FIG. 2 is a block diagram illustrating an example of a functional configuration of a three-dimensional point cloud label learning apparatus 10A according to the present embodiment.

During learning, the three-dimensional point cloud label learning apparatus 10A is configured not to use the deep neural network estimating unit 22 and the three-dimensional point cloud with the estimated label 12J.

When the three-dimensional point cloud 12A including a three-dimensional position (x, y, z) at each point and an intensity value indicating the reflection intensity at each point, and the ground surface height 12B are input, the ground-based height calculation unit 14 according to the present embodiment calculates a ground-based height at each point of the three-dimensional point cloud 12A, and outputs a three-dimensional point cloud with a ground-based height 12C to which the calculated ground-based height is assigned.

Figure 3:
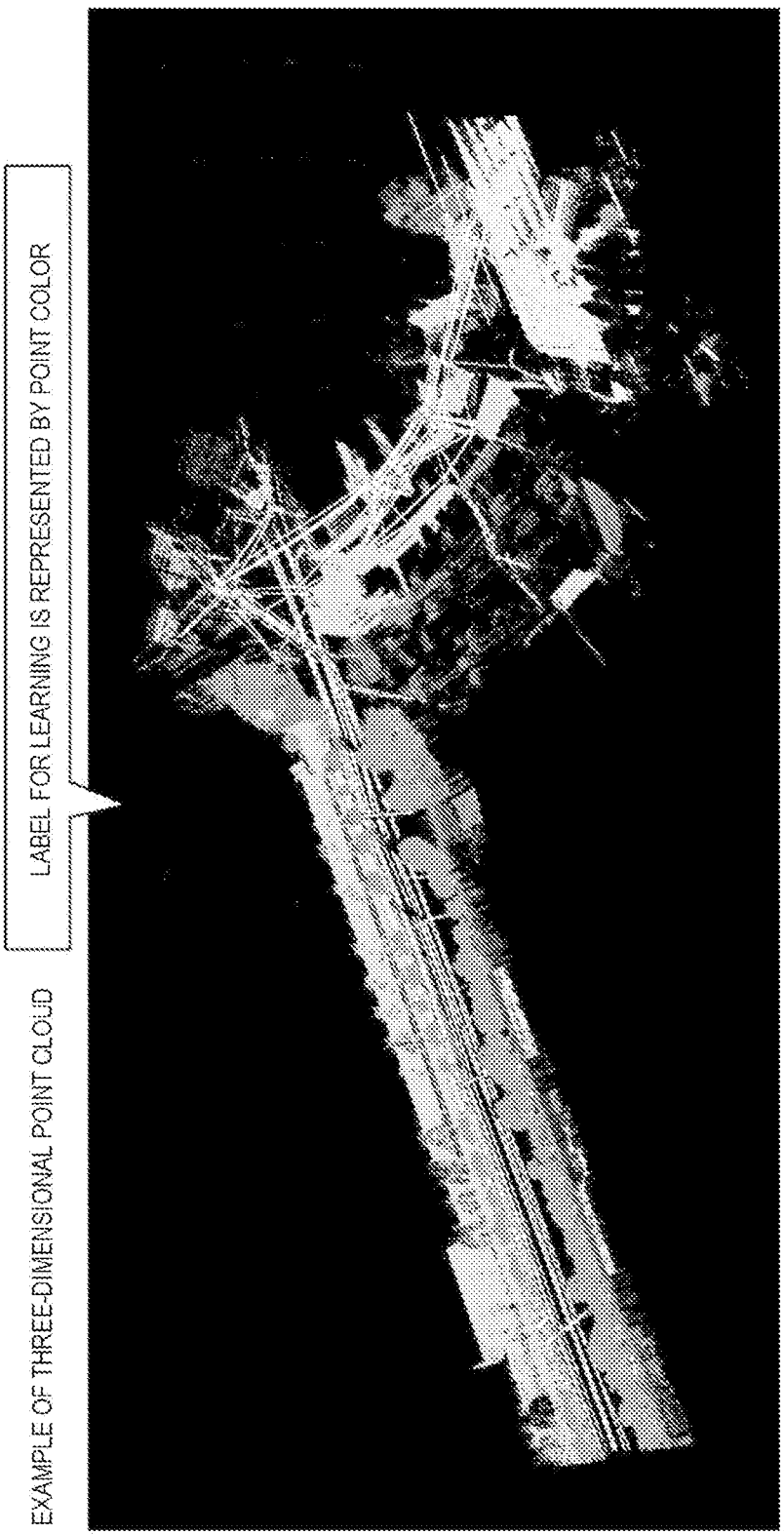
FIG. 3 is a diagram illustrating an example of a three-dimensional point cloud according to the embodiment.

Here, the input three-dimensional point cloud 12A will be described with reference to FIG. 3. Note that FIG. 3 is a diagram illustrating an example of a three-dimensional point cloud 12A according to the present embodiment. Further, the example of the three-dimensional point cloud 12A illustrated in FIG. 3 is actually illustrated as a color image, but is illustrated as a grayscale image for convenience in the present example.

The three-dimensional point cloud 12A is a set of points each having a three-dimensional position (x, y, z) and an intensity value as an attribute value. In the present embodiment, for the three-dimensional position, z indicates the height of the point, and x and y indicate the horizontal position of the point, but these x, y, and z may be freely taken.

In the three-dimensional point cloud data for learning, a point cloud label for learning 12E, which is a label indicating what kind of object each point of the three-dimensional point cloud 12A belongs to, is assigned. The point cloud label for learning 12E is manually created by a person prior to learning. This label is unnecessary for the three-dimensional point cloud data for estimation, but some labels (such as the ground surface) may be assigned in the preprocessing. In particular, when a label of the ground surface is assigned irrespective of the three-dimensional point cloud data for learning or the three-dimensional point cloud data for estimation, the ground-based height calculation unit 14 may use the information.

The intensity-RGB conversion unit 16 according to the present embodiment receives the three-dimensional point cloud with a ground-based height 12C as an input and outputs the intensity-RGB converted three-dimensional point cloud with a ground-based height 12D which is obtained by converting the intensity value into RGB values indicating color information for each point of the three-dimensional point cloud with a ground-based height 12C.

The supervoxel clustering unit 18 according to the present embodiment inputs the following input items, clusters the intensity-RGB converted three-dimensional point cloud with the ground-based height 12D into a plurality of supervoxels by using the three-dimensional position and the RGB values, and outputs supervoxel data with a correct answer label, which indicates the point cloud information and the attribute including the intensity value and the ground-based height for each of the clustered supervoxels.

The above input items are the following items.
  Intensity-RGB converted three-dimensional point cloud with ground-based height 12D.
  A point cloud label for learning 12E including a label assigned in advance to each point of the three-dimensional point cloud 12A.
  Clustering hyperparameter 12F.

The deep neural network learning unit 20 according to the present embodiment receives supervoxel data with a correct answer label and the deep neural network hyperparameter 12H as inputs, and learns a learned deep neural network parameter 12I of a deep neural network for estimating a label from supervoxel data 12G indicating the supervoxel attribute and the point cloud information.

Further, a z-coordinate of each point of the three-dimensional point cloud 12A may be handled as the ground-based height as it is, and the RGB values may not be used in the clustering. In this case, the supervoxel clustering unit 18 inputs the following input items, clusters the three-dimensional point cloud 12A into a plurality of supervoxels by using the three-dimensional position, and outputs supervoxel data with a correct answer label, which indicates the point cloud information and the attribute including the intensity value and the ground-based height for each of the clustered supervoxels. The above input items are the following items.

- A three-dimensional position including a ground-based height at each point, and a three-dimensional point cloud 12A including an intensity value or RGB values at each point.
- Point cloud label for learning 12E
- Clustering hyperparameter 12F.

When the three-dimensional point cloud 12A includes the RGB values at each point instead of the intensity value, the supervoxel data with the correct answer label may include the RGB values as attributes instead of the intensity value. When the three-dimensional point cloud 12A includes both the intensity value and the RGB values at each point, the supervoxel data with the correct answer label may include both the intensity value and the RGB values as attributes. The deep neural network learning unit 20 receives supervoxel data with a correct answer label and the deep neural network hyperparameter 12H as inputs, and learns a learned deep neural network parameter 12I of a deep neural network for estimating a label from supervoxel data 12G indicating the supervoxel attribute and the point cloud information. That is, in this embodiment, the ground-based height calculation unit 14 and the intensity-RGB conversion unit 16 may be unnecessary.

Next, the operation of the three-dimensional point cloud label learning apparatus 10A according to the present embodiment will be described with reference to FIG. 4. Note that FIG. 4 is a flowchart illustrating an example of a processing procedure of a learning processing routine by a three-dimensional point cloud label learning/estimating processing program according to the present embodiment.

Figure 4:
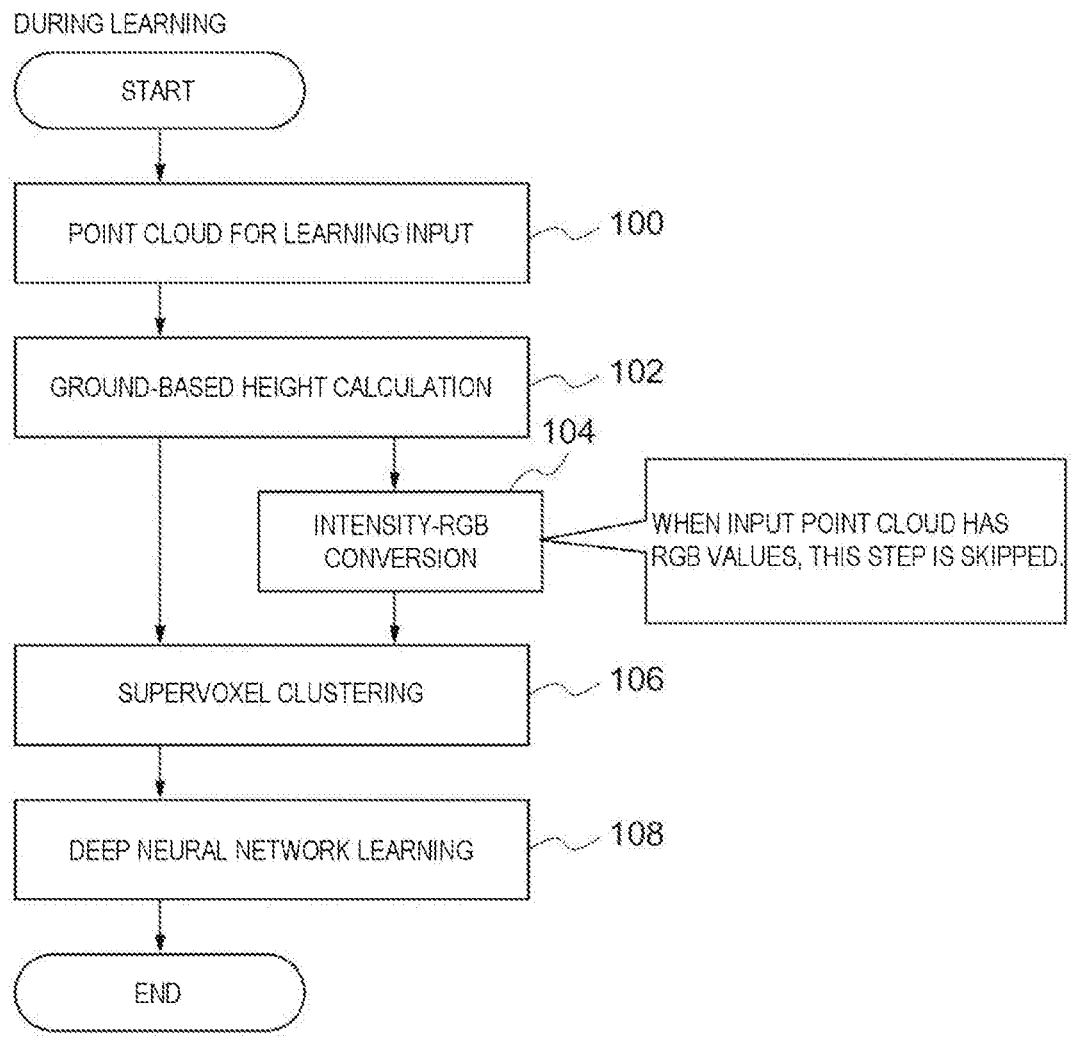
FIG. 4 is a flowchart illustrating an example of a processing procedure of a learning processing routine by a three-dimensional point cloud label learning/estimating processing program according to the embodiment.

In step 100 of FIG. 4, the ground-based height calculation unit 14 receives inputs of a three-dimensional point cloud 12A as a point cloud for learning and an arbitrary ground surface height 12B.

In step 102, the ground-based height calculation unit 14 calculates the ground-based height at each point included in the three-dimensional point cloud 12A using the ground surface height 12B, and outputs a three-dimensional point cloud with a ground-based height 12C to which the calculated ground-based height is assigned. When the ground surface height 12B is not assigned, it is assumed that the label of the attribute of the ground surface is assigned to the three-dimensional point cloud 12A in advance. As a method of assigning a label of the attribute of the ground surface to the point cloud, for example, a method may be used in which a plane is fitted to a three-dimensional point cloud by using Random Sample Consensus (RANSAC), and a point at a distance less than or equal to a certain threshold value from the fitted plane is used as the ground surface.

When the ground surface height 12B is assigned, the ground-based height of the point is calculated by subtracting the ground surface height from the z coordinate of each point of the three-dimensional point cloud 12A. On the other hand, when the label of the attribute of the ground surface is assigned in advance to the three-dimensional point cloud 12A, the ground-based height is calculated by subtracting, from the z-coordinate of each point of the three-dimensional point cloud 12A, the z-coordinate of the point to which the label of the ground surface closest to the point is assigned. In any case, the calculated ground-based height information is assigned to the input three-dimensional point cloud 12A and output as the three-dimensional point cloud with the ground-based height 12C.

In step 104, the intensity-RGB conversion unit 16 receives the three-dimensional point cloud with a ground-based height 12C as an input and outputs the intensity-RGB converted three-dimensional point cloud with a ground-based height 12D which is obtained by converting the intensity value into RGB values for each point of the three-dimensional point cloud with the ground-based height 12C. The reason why the intensity value is converted to the RGB values is to use the RGB values for clustering in the subsequent supervoxel clustering unit 18.

When each point of the three-dimensional point cloud 12A has RGB values as an attribute instead of the intensity value, it is not necessary to perform the intensity-RGB conversion. Thus, the three-dimensional point cloud with the ground-based height 12C output from the ground-based height calculation unit 14 is directly input to the supervoxel clustering unit 18. That is, in this case, the intensity-RGB conversion unit 16 is skipped.

When the z-coordinate of each point of the three-dimensional point cloud 12A is handled as the ground-based height as it is and only the three-dimensional position is used, it is not necessary to calculate the ground-based height, and it is not necessary to perform the intensity-RGB conversion as well. Thus, the three-dimensional point cloud 12A is directly input to the supervoxel clustering unit 18. That is, in this case, the ground-based height calculation unit 14 and the intensity-RGB conversion unit 16 are skipped.

Here, when the three-dimensional point cloud with the ground-based height 12C has an intensity value at each point as an attribute, the intensity-RGB conversion unit 16 performs the following processing in the conversion of the intensity value at each point into RGB values.

The intensity value (intensity) of each of the points included in the three-dimensional point cloud with the ground-based height 12C is read, and the maximum value (max_intensity) is obtained. The RGB values of each of the points are derived using the following equation (1).

[Math. 1]

$$R = G = B = \frac{\text{intensity}}{\text{max\_intensity}} \times \text{max\_value} \quad (1)$$

In the above equation (1), max_value is the maximum value that each of R, G, and B can take. For example, when each of R, G, and B is an 8-bit unsigned integer type, max_value=255. When the values of R, G, and B are calculated, the values are assigned to the input three-dimensional point cloud with the ground-based height 12C, and are output as the intensity-RGB converted three-dimensional point cloud with the ground-based height 12D.

In step 106, the supervoxel clustering unit 18 receives the intensity-RGB converted three-dimensional point cloud with the ground-based height 12D, the point cloud label for learning 12E, and the clustering hyperparameter 12F as inputs, clusters the intensity-RGB converted three-dimensional point cloud with the ground-based height 12D into a plurality of supervoxels by using the three-dimensional position and the RGB values, and outputs supervoxel data with a correct answer label, which indicates the attribute and the point cloud information, for each of the clustered supervoxels. The point cloud label for learning 12E is input only during learning, and is not input during estimation.

As an example, the supervoxel clustering unit 18 divides the intensity-RGB converted three-dimensional point cloud with the ground-based height 12D using a method described in Non Patent Literature 2 below.

Non Patent Literature 2: Papon, A. Abramov, M. Schoeler and F. Woergoetter, "Voxel Cloud Connectivity Segmentation—Supervoxels for Point Clouds", 2013 IEEE Conference on Computer Vision and Pattern Recognition, Portland, Oreg., 2013, pp. 2027-2034.

Specifically, the following processes (S1 to S5) are performed.

(S1) The clustering hyperparameter 12F is read. The clustering hyperparameter 12F constituted by five parameters r_seed, r_voxel, w_c, w_s, and w_n.

(S2) By focusing on coordinates (x, y, z) of the intensity-RGB converted three-dimensional point cloud with the ground-based height 12D, it is divided into voxels in which one side length is r_voxel.

(S3) For the divided voxels, voxels are extracted for each distance r_seed in the (x, y, z) direction and the extracted voxels are set as nucleus voxels, which are voxels serving as a nucleus of segmentation. Each of these nucleus voxels belongs to a different supervoxel. Here, the "point" is data having xyz coordinates and an arbitrary number of attributes (such as intensity or RGB). The voxel is obtained by dividing a xyz space into cubes of a predetermined size and collecting points included in the cubes. Thus, there are no voxels in a section where there are no points. For each of the voxels, the xyz coordinate is the center of the cube, the RGB value is the average of the RGB values of points presenting in the voxel, and the normal vector is the average of the normal vectors of points presenting in the voxel. Also, a part of the voxel becomes a nucleus voxel. As described above, the selection of the nucleus voxel is performed by extracting the voxels for each distance r_seed in each of the xyz directions. This nucleus voxel is a voxel that becomes a starting point when performing a supervoxel clustering (invasive clustering method). The supervoxel is an output of the supervoxel clustering, and is a set of a plurality of voxels. The supervoxel is constituted by one nucleus voxel and voxels clustered in the same region as the nucleus voxel. The number of nucleus voxels and the number of supervoxels are the same.

(S4) Starting from each nucleus voxel, the adjacent voxels are invasively searched, and a supervoxel to which the voxel belongs, is determined by a distance index D of the following equation (2). By this process, each voxel belongs to the supervoxel where the distance index D of the equation (2) is the smallest of the calculated ones and a spatially connected nucleus voxel belongs to.

[Math. 2]

$$D = \sqrt{w\_c \cdot D\_c^{\wedge}2 + \frac{w\_s \cdot D\_s * 2}{S \cdot r\_seed * 2} + w\_n \cdot D\_n^{\wedge}2} \quad (2)$$

In the above equation (2), w_c, w_s, w_n, and r_seed are clustering hyperparameters 12F, and D_c, D_s, and D_n are a distance between the RGB values of the focused voxel and the nucleus voxel, a distance between the three-dimensional positions of the focused voxel and the nucleus voxel, and a distance between the normal of the focused voxel and the nucleus voxel, respectively. Note that when the RGB values are not used for clustering, it is defined as D_c=0.

Figure 5:
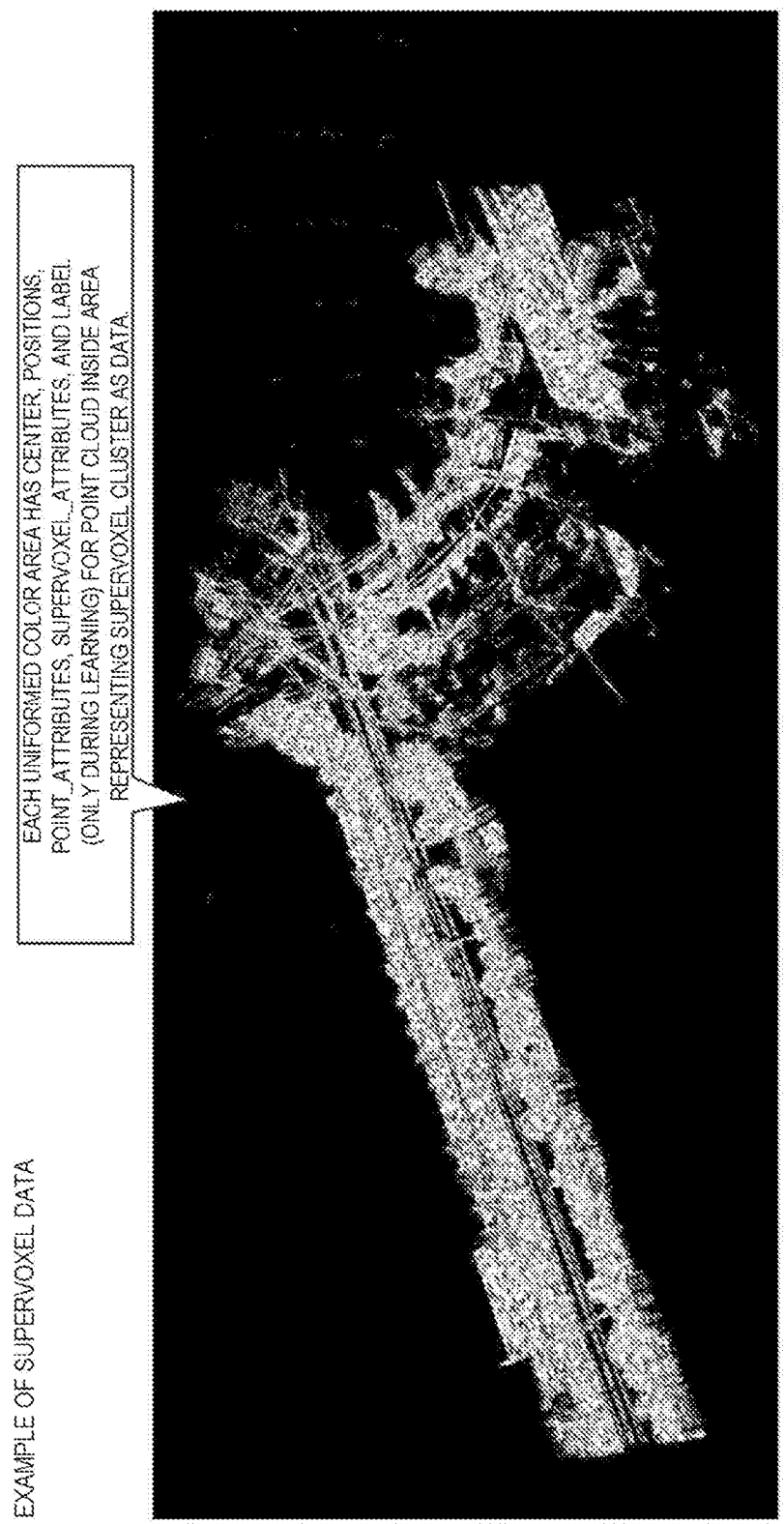
FIG. 5 is a diagram illustrating an example of supervoxel data according to the embodiment.

(S5) The point cloud clustered into the plurality of supervoxels is stored as, for example, supervoxel data 12G as illustrated in FIG. 5. Although the example of the supervoxel data 12G illustrated in FIG. 5 is actually illustrated as a color image, in the present example, it is illustrated as a gray scale image for convenience. The supervoxel data 12G to be stored includes the following data (D1 to D4).

(D1) center: an average value of (x, y, z) of a point cloud belonging to a supervoxel.

(D2) positions: (x, y, z) coordinates of all points belonging to a supervoxel, with an original point being the center described above.

(D3) point_attributes: attribute information (Intensity, RGB, or the like) possessed by a point cloud belonging to a supervoxel. Note that RGB values obtained from the conversion by the intensity-RGB conversion unit 16 are not included. Hereinafter, the number of attributes included in point_attributes is set to a. When the three-dimensional point cloud 12A includes the RGB values at each point instead of the intensity value, the point_attributes includes the RGB values instead of the intensity value. Further, when the three-dimensional point cloud 12A includes both the intensity value and the RGB values at each point, the point_attributes includes both the intensity value and the RGB value.

(D4) supervoxel_attributes: an average value (height) of a ground-based height of points included in a supervoxel, the number of points included in the supervoxel (num_of_points), and an arbitrary number of feature amounts derived for the supervoxel are included. Hereinafter, the number of attributes included in supervoxel_attributes is set to b.

The supervoxel data with the correct answer label obtained during learning is obtained by assigning the following data (D5) to the supervoxel data 12G.

(D5) (Only during learning) labels: correct answer label. A label to which a point included in a supervoxel belongs is searched by referencing the point cloud label for learning, and a label to which the point belonging to the supervoxel becomes largest is set. However, when the maximum number of labels of points belonging to the supervoxel is less than the threshold value of the points constituting the supervoxel, a label of "other" is assigned. The threshold value is, for example, 50%. It is assumed that there are k types of labels including others, and the data is 0, 1, . . . , k−1.

It is assumed that the supervoxel data with the correct answer label generated in step 106 is constituted by M pieces of supervoxels. When the supervoxel clustering unit 18 receives a three-dimensional point cloud with the ground-based height 12C including the RGB values instead of the intensity value, the point cloud label for learning 12E, and the clustering hyperparameter 12F, the three-dimensional point cloud with the ground-based height 12C may be clustered into a plurality of supervoxels using the three-dimensional position and the RGB values. Further, when the supervoxel clustering unit 18 receives a three-dimensional position including the ground-based height and a three-dimensional point cloud 12A including the intensity value at each point, the point cloud label for learning 12E, and the clustering hyperparameter 12F, the three-dimensional point cloud 12A may be clustered into a plurality of supervoxels using the three-dimensional position.

In step 108, the deep neural network learning unit 20 receives supervoxel data with a correct answer label and the deep neural network hyperparameter 12H as inputs, learns and outputs a learned deep neural network parameter 12I of a deep neural network for estimating a label from supervoxel data 12G indicating the supervoxel attribute and the point cloud information, and ends the present learning processing routine.

Hereinafter, it is assumed that M pieces of supervoxels obtained from the processing by the supervoxel clustering unit 18 are divided into M_1 pieces of learning data sets and M_2 verification data set. In this case, it is defined as M_1+M_2=M. Although M_1 and M_2 may be freely set, M_1 is usually set to substantially 0.8 to 0.9 times the size of M.

The above-described deep neural network hyperparameter 12H is a parameter set that determines the learning method of the deep neural network including the following information (1 to 8). The names in parentheses represents variable names.

(1) Number of input points (N): Determines the maximum number of points received as an input of a deep neural network per supervoxel.
(2) Optimization algorithm (optimizer): Determines an optimization method of a deep neural network (Gradient Decent, Moment, Adam, or the like).
(3) Learning efficiency (learning_rate): The efficiency of updating an initial deep neural network parameter.
(4) Learning efficiency decay rate (decay_rate): A value used when calculating a learning efficiency decay.
(5) Learning efficiency decay step (decay_steps): A value used when calculating a learning efficiency decay.
(6) Number of learning epochs (max_epoch): The number of epochs for updating a deep neural network parameter.
(7) Batch size (batch_size): The number of data (supervoxels) used in one update of deep neural network parameters.
(8) Number of labels (k): The total number of labels including "others".

The above-described deep neural network hyperparameter 12H is a parameter generally defined during learning of the deep neural network, not limited to the present embodiment, except for the number of input points (N) and the number of labels (k) of parameters. In the present embodiment, the method of optimizing the deep neural network is not limited, and the present parameter set can be replaced with a combination of other known parameters.

As an example, the equation (3) illustrates an updating equation of the deep neural network parameter when "Gradient Descent" is selected by the optimizer.

[Math. 3]

$$\text{global\_step} = \text{batch\_index} \times \text{batch\_size} + \text{current\_epoch} \times M\_1$$

$$\text{decayed\_learning\_rate} = \text{learning\_rate} \times \text{decay\_rate}^{(\text{global\_step}/\text{decay\_steps})}$$

$$w_{(1+i)} = w_{(i)} - \text{decayed\_learning\_rate} \times \nabla \text{batch\_loss} \quad (3)$$

In the above equation (3), batch_index is a batch index (0, 1, ..., M_1/batch_size−1) used for updating the weight. Note that batch_index is an integer, and thus the result of the division of M_1/batch_size is rounded down to below decimal point so that the result becomes an integer. Here, current_epoch is the current number of epochs (0, 1, ..., max_epoch−1). Here, batch_loss is a sum of the "loss" of batch_size pieces of learning data ("loss" is an intersection entropy between the output of the deep neural network for one piece of data and the one hot encoded correct answer label). Here, $w\_\{i\}$ is a deep neural network parameter after the i-th update.

The learned deep neural network parameter 12I is data constituted by a set of weights and biases of each link of the deep neural network. After the completion of each epoch, the loss (total_loss) of the entire verification data set is evaluated, and the deep neural network parameter when total_loss is minimized is stored as learned deep neural network parameter 12I. Updating of the deep neural network parameters is repeated until max_epoch times of epoch are completed.

Next, the structure of the deep neural network used in the deep neural network learning unit 20 will be described. The deep neural network is constituted by the following layers (L1 to L13). Note that "mlp" is an abbreviation for a multi-layer perceptron.

(L1) positions input layer
(L2) geometric transformation network layer i
(L3) point_attributes input layer
(L4) mlp layer i
(L5) geometric transformation network layer ii
(L6) mlp layer ii
(L7) max pooling layer
(L8) supervoxel_attributes input layer
(L9) mlp layer iii
(L10) softmax layer
(L11) label input layer
(L12) one hot encode layer
(L13) cross entropy layer The above-mentioned mlp is processing in which processing of single-layer perceptron (slp) is applied a plurality of times. Here, slp is processing defined by the number of input channels and the number of output channels. The processing of slp [i, j] in which the number of input channels is i and the number of output channels is j is illustrated in the equation (4). In the equation (4), the "input" is an i-dimensional vector. Here, perceptron_weight is a j×i weight matrix. Here, perceptron_bias is a j-dimensional vector. Here, "output" is a j-dimensional vector. Here, activate ( ) represents an application of an activation function.

[Math. 4]

$$\text{output} = \text{activate}(\text{perceptron\_weight} \times \text{input} + \text{perceptron\_bias}) \quad (4)$$

Figure 6:
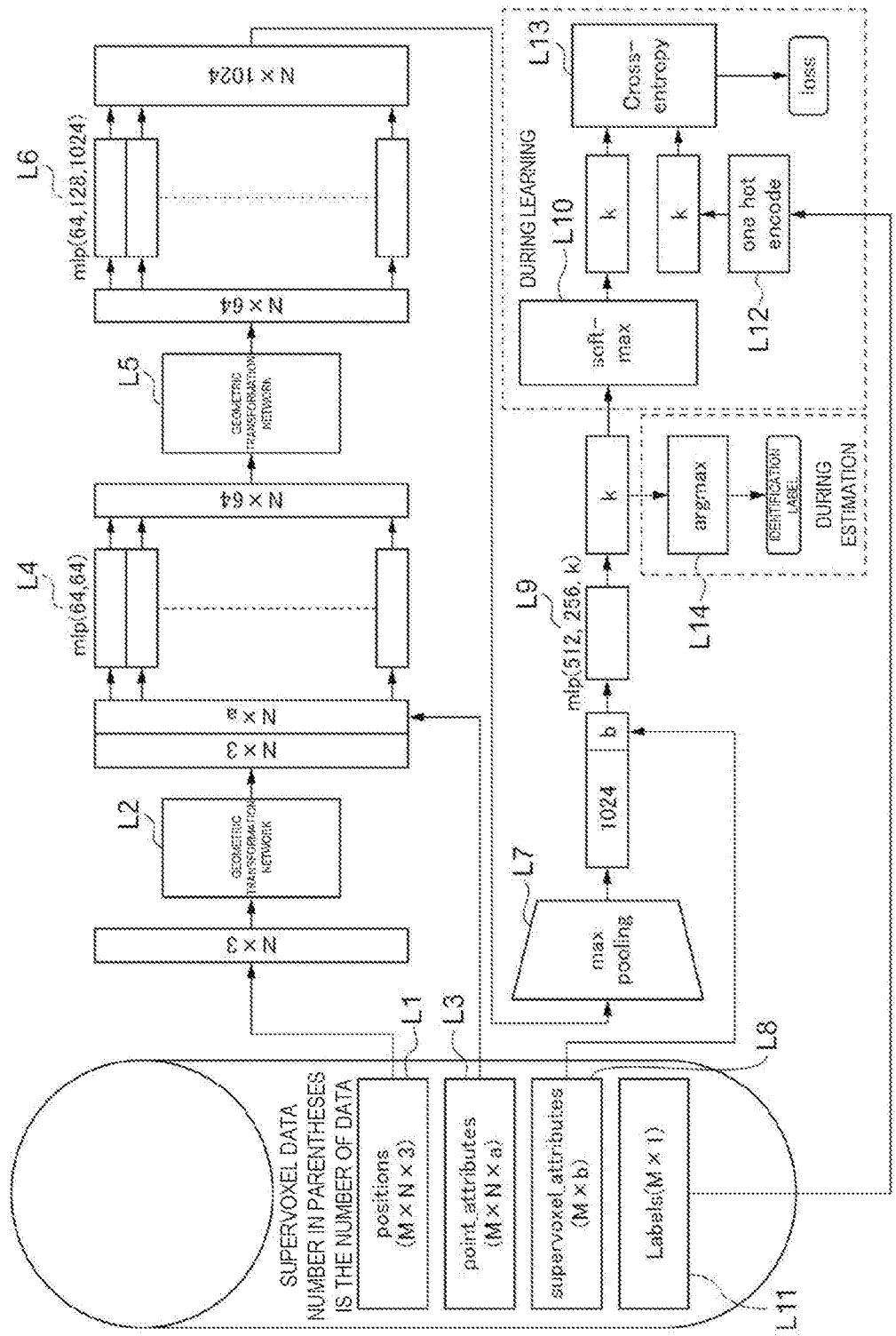
FIG. 6 is a diagram illustrating an example of a structure of a deep neural network according to the embodiment.

Next, the processing of each layer of the deep neural network will be specifically described with reference to FIG. 6. Note that FIG. 6 is a diagram illustrating an example of a structure of a deep neural network according to the present embodiment. In the example illustrated in FIG. 6, only the number of output channels is described for mlp, and the number of input channels is omitted. The example illustrated in FIG. 6 is a specific example, and may be applied to the present embodiment by changing the number of layers, channels, and the like of mlp, which is a component of each layer. In addition, although processing for one supervoxel data is described, in practice, supervoxel data of the number of batch_size is input at one time and processed at one time.

As illustrated in FIG. 6, the positions input layer (L1) is a layer for inputting positions, which are three-dimensional coordinate values included in the supervoxel data. When the number of points included in the supervoxel is equal to or more than N, the input is terminated at N pieces of points, and when it is less than N, (0,0,0) is input for the missing data. As a result, data positions_input which is input in the present layer is N×3.

Next, specific processing of the geometric transformation network layer i (L2) will be described with reference to FIG. 7. Note that FIG. 7 is a diagram illustrating an example of a structure of a geometric transformation network that is a part of the deep neural network according to the present embodiment.

Figure 7:
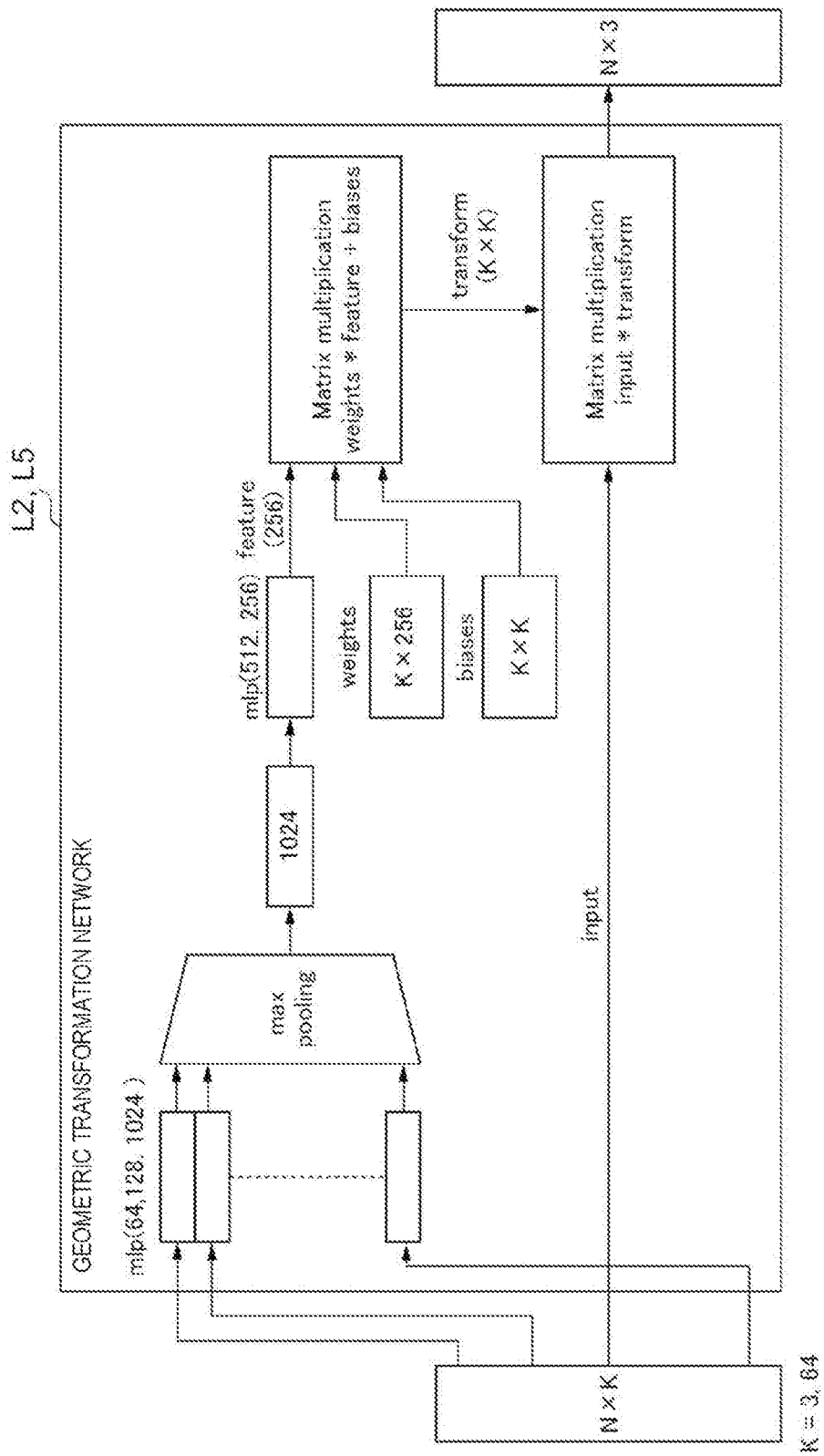
FIG. 7 is a diagram illustrating an example of a structure of a geometric transformation network that is a part of the deep neural network according to the embodiment.

As illustrated in FIG. 7, in the geometric transformation network layer i (L2), the number of channels of the input data is three channels, thereby the value of K in FIG. 7 is three. First, N×three-dimensional input data (positions_input) is processed with mlp (slp[3, 64], slp[64,128], slp[128, 1024]), and an N×1024-dimensional intermediate output 1 is obtained. The intermediate output 1 is subjected to max pooling processing to obtain an intermediate output 2 of a 1024-dimensional vector. By processing the intermediate output 2 with mlp (slp[1024, 512], slp[512, 256]), a 256-dimensional intermediate output 3 (transform_feature_i) is obtained. In contrast to this, a matrix operation is performed using a 3×256-dimensional weight (transform_weight_i) and a 3× three-dimensional bias (transform_biases_i) according to the following equation (5). Accordingly, a 3×three-dimensional transform_matrix_i is obtained.

[Math. 5]

$$\text{transform\_matrix}\_i = \text{transform\_weight}\_i \times \text{transform\_feature}\_i + \text{transform\_biases}\_i \quad (5)$$

Next, using transform_matrix_i, a matrix operation is performed by using the equation (6) to obtain transform_output_i, which is an output of the present layer.

[Math. 6]

$$\text{transform\_output}\_i = \text{transform\_input}\_i \times \text{transform\_matrix}\_i \quad (6)$$

Next, returning to FIG. 6, in a point_attributes input layer (L3), point_attributes included in the supervoxel data are input to the deep neural network. By combining N×three-dimensional transform_output_i with N×a-dimensional point_attributes, N×(3+a)-dimensional concatenated_output_i is output.

In the mlp layer i (L4), by processing the N×(3+a)-dimensional concatenated_output_i with mlp (slp[(3+a), 64], slp[64, 64]), the N×64-dimensional mlp_output_i is obtained.

Next, the processing of the geometric transformation network layer ii (L5) will be specifically described with reference to FIG. 7. In the geometric transformation network layer ii (L5), the number of channels of the input data is 64 channels, thereby the value of K in FIG. 7 is 64. First, the N×64-dimensional input data (mlp_output_i) is processed with mlp (slp[64, 64], slp[64,128], slp[128, 1024]), and an N×1024-dimensional intermediate output 1 is obtained. The intermediate output 1 is subjected to max pooling processing to obtain an intermediate output 2 of a 1024-dimensional vector. By processing the intermediate output 2 with mlp (slp[1024, 512], slp[512, 256]), a 256-dimensional intermediate output 3 (transform_feature_ii) is obtained. In contrast to this, a matrix operation is performed using a 64×256-dimensional weight (transform_weight_ii) and a 64×64-dimensional bias (transform_biases_ii) according to the following equation (7). Accordingly, a 64×64-dimensional transform_matrix_ii is obtained.

[Math. 7]

$$\text{transform\_matrix}\_ii = \text{transform\_weight}\_ii \times \text{transform\_feature}\_ii + \text{transform\_biases}\_ii \quad (7)$$

Next, using transform_matrix_ii, a matrix operation is performed by using the equation (8) to obtain transform_output_ii, which is an output of the present layer.

[Math. 8]

$$\text{transform\_output}\_ii = \text{transform\_input}\_ii \times \text{transform\_matrix}\_ii \quad (8)$$

Next, returning to FIG. 6, in the mlp layer ii (L6), by processing the N×64-dimensional transform_output_ii with is processed at mlp (slp [64, 64], slp [64, 128], slp [128, 1024]), the N×1024-dimensional mlp_output_ii is obtained.

In the max pooling layer (L7), by applying max pooling processing to N×1024 dimensional mlp_output_ii, 1×1024-dimensional max pooling output is obtained.

In the supervoxel_attributes input layer (L8), by combining 1×b-dimensional supervoxel_attributes with 1×1024-dimensional max pooling output, 1×(1024+b)-dimensional concatenated_output_ii is output In the mlp layer iii (L9), 1×(1024+b)-dimensional concatenated_output_ii is processed with mlp(slp[(1024+b), 512], slp[512, 256], slp[256, k]), 1×k-dimensional mlp_output_iii is obtained.

In the softmax layer (L10), by applying a softmax calculation to the 1×k-dimensional mlp_output_iii, an 1×k-dimensional softmax_output is output.

In the label input layer (L11), labels included in the supervoxel data are input. Note that one hot encode processing is executed on each label value that is an integer value of 0, 1, . . . , k−1 in a one hot encode layer (L12), and an 1×k-dimensional label_input is output.

In the cross entropy layer (L13), by calculating a cross entropy of a softmax_output from the softmax layer (L10) and a label_input from the one hot encode layer (L12), a loss is calculated.

The loss calculated in the last layer is summed up for batch_size pieces of the supervoxels, and a batch_loss is calculated. The update of the deep neural network parameter by the optimizer applied using the batch_loss is performed. Note that the updating equation when the optimizer is set to gradient descent is as illustrated in the above equation (3).

Next, a three-dimensional point cloud label estimating apparatus that performs a label estimation of a three-dimensional point cloud using the learning result of the three-dimensional point cloud label learning apparatus will be described.

Figure 8:
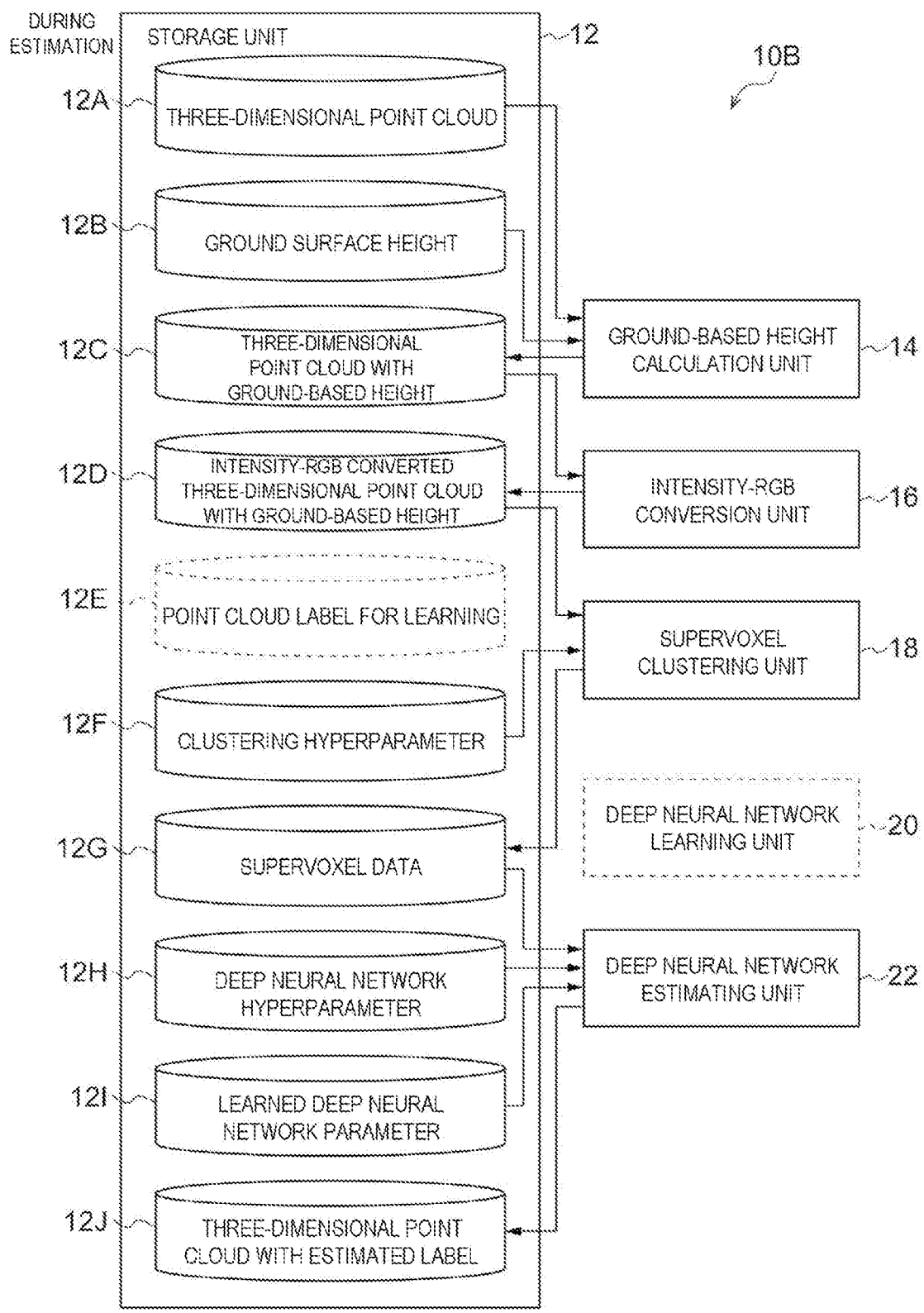
FIG. 8 is a block diagram illustrating an example of a functional configuration of a three-dimensional point cloud label estimating apparatus according to an embodiment.

FIG. 8 is a block diagram illustrating an example of a functional configuration of a three-dimensional point cloud label estimating apparatus 10B according to the present embodiment.

The three-dimensional point cloud label estimating apparatus 10B during estimation does not use the deep neural network learning unit 20 and the point cloud label for learning 12E.

When the three-dimensional point cloud 12A including a three-dimensional position (x, y, z) at each point and an intensity value indicating the reflection intensity at each point, and the ground surface height 12B are input, as in the case during learning, the ground-based height calculation unit 14 according to the present embodiment calculates a ground-based height at each point of the three-dimensional point cloud 12A, and outputs a three-dimensional point cloud with a ground-based height 12C to which the calculated ground-based height is assigned.

The intensity-RGB conversion unit 16 according to the present embodiment receives the three-dimensional point cloud with a ground-based height 12C as an input and outputs the intensity-RGB converted three-dimensional point cloud with a ground-based height 12D which is obtained by converting the intensity value into RGB values indicating color information for each point of the three-dimensional point cloud with a ground-based height 12C.

The supervoxel clustering unit 18 according to the present embodiment receives the intensity-RGB converted three-dimensional point cloud with the ground-based height 12D and the clustering hyperparameter 12F as inputs, cluster the intensity-RGB converted three-dimensional point cloud with the ground-based height 12D into a plurality of supervoxels by using the three-dimensional position and the RGB values, and outputs the supervoxel data 12G indicating the point cloud information and the attribute including the intensity value and the ground-based height for each of the clustered supervoxels.

The deep neural network estimating unit 22 according to the present embodiment receives the supervoxel data 12G, a deep neural network hyperparameter 12H, and a learned deep neural network parameter 12I in which a deep neural network is pre-learned for estimating the label from the supervoxel data 12G as an input, derives an estimated label for each of the supervoxels by using the deep neural network, and outputs a three-dimensional point cloud with the estimated label 12J to which the derived estimated label is assigned.

Note that as in the case during learning, a z-coordinate of each point of the three-dimensional point cloud 12A is handled as the ground-based height as it is, and the RGB values may not be used in the clustering. In this case, the supervoxel clustering unit 18 inputs the following input items, clusters the three-dimensional point cloud 12A into a plurality of voxels by using the three-dimensional position, and outputs supervoxel data 12G, which indicates the point cloud information and the attribute including the intensity value and the ground-based height for each of the clustered supervoxels. The above input items are the following items.

A three-dimensional position including a ground-based height at each point, and a three-dimensional point cloud 12A including an intensity value or RGB values at each point.

Clustering hyperparameter 12F.

When the three-dimensional point cloud 12A includes the RGB values at each point instead of the intensity value, the supervoxel data 12G may include the RGB values as attributes instead of the intensity value. When the three-dimensional point cloud 12A includes both the intensity value and the RGB values at each point, the supervoxel data 12G may include both the intensity value and the RGB values as attributes. The deep neural network estimating unit 22 receives the supervoxel data 12G, a deep neural network hyperparameter 12H, and a learned deep neural network parameter 12I as an input, derives an estimated label for each of the supervoxels by using the deep neural network, and outputs a three-dimensional point cloud with the estimated label 12J to which the derived estimated label is assigned. That is, in this embodiment, the ground-based height calculation unit 14 and the intensity-RGB conversion unit 16 may be unnecessary.

Next, the operation of the three-dimensional point cloud label estimating apparatus 10B according to the present embodiment will be described with reference to FIG. 9. Note that FIG. 9 is a flowchart illustrating an example of a processing procedure of an estimating processing routine by a three-dimensional point cloud label learning/estimating processing program according to the present embodiment.

Figure 9:
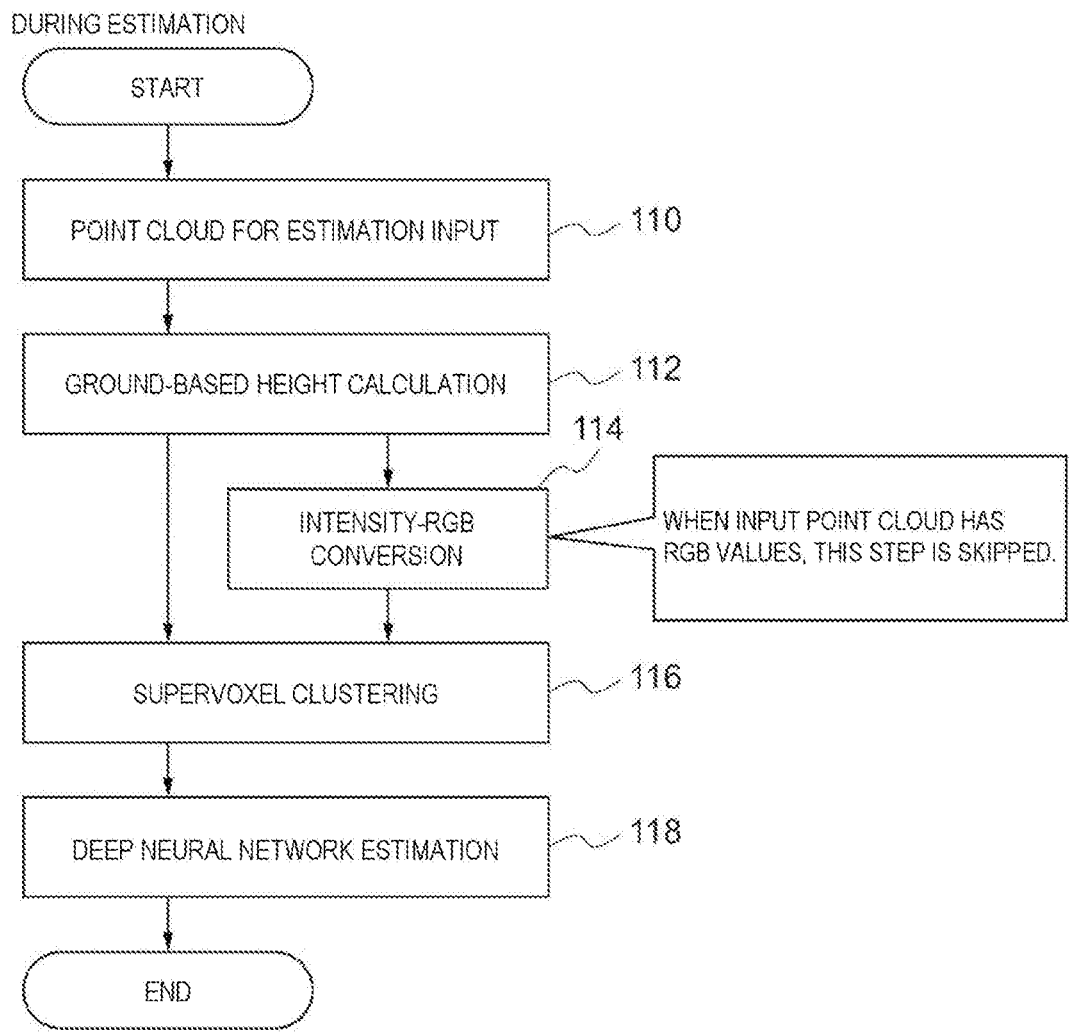
FIG. 9 is a flowchart illustrating an example of a processing procedure of an estimating processing routine by a three-dimensional point cloud label learning/estimating processing program according to the embodiment.

In step 110 of FIG. 9, the ground-based height calculation unit 14 receives inputs of a three-dimensional point cloud 12A as a point cloud for estimation and an arbitrary ground surface height 12B.

In step 112, the ground-based height calculation unit 14 calculates the ground-based height at each point included in the three-dimensional point cloud 12A using the ground surface height 12B, and outputs a three-dimensional point cloud with a ground-based height 12C to which the calculated ground-based height is assigned.

In step 114, the intensity-RGB conversion unit 16 receives the three-dimensional point cloud with a ground-based height 12C as an input and outputs the intensity-RGB converted three-dimensional point cloud with a ground-based height 12D which is obtained by converting the intensity value into RGB values for each point of the three-dimensional point cloud with the ground-based height 12C.

When each point of the three-dimensional point cloud 12A has RGB values as an attribute instead of the intensity value, it is not necessary to perform the intensity-RGB conversion. Thus, the three-dimensional point cloud with the ground-based height 12C output from the ground-based height calculation unit 14 is directly input to the supervoxel clustering unit 18. That is, in this case, the intensity-RGB conversion unit 16 is skipped.

When the z-coordinate of each point of the three-dimensional point cloud 12A is handled as the ground-based height as it is and only the three-dimensional position is used, it is not necessary to calculate the ground-based height, and it is not necessary to perform the intensity-RGB conversion as well. Thus, the three-dimensional point cloud 12A is directly input to the supervoxel clustering unit 18. That is, in this case, the ground-based height calculation unit 14 and the intensity-RGB conversion unit 16 are skipped.

In step 116, the supervoxel clustering unit 18 receives the intensity-RGB converted three-dimensional point cloud with a ground-based height 12D and the clustering hyperparameter 12F as inputs, clusters the intensity-RGB converted three-dimensional point cloud with the ground-based height 12D into a plurality of supervoxels by using the three-dimensional position and the RGB values, and outputs the supervoxel data 12G indicating the attribute and the point cloud information for each of the clustered supervoxels.

Note that the point cloud label for learning 12E is not input during estimation.

When the supervoxel clustering unit 18 receives a three-dimensional point cloud with the ground-based height 12C including the RGB values instead of the intensity value and the clustering hyperparameter 12F, the three-dimensional point cloud with the ground-based height 12C may be clustered into a plurality of supervoxels using the three-dimensional position and the RGB values. Further, when the supervoxel clustering unit 18 receives a three-dimensional position, which includes the ground-based height and a three-dimensional point cloud 12A including the intensity value, and the clustering hyperparameter 12F, the three-dimensional point cloud 12A may be clustered into a plurality of supervoxels using the three-dimensional position.

In step 118, the deep neural network estimating unit 22 receives the supervoxel data 12G, a deep neural network hyperparameter 12H, and a learned deep neural network parameter 12I as an input, uses the deep neural network, outputs the three-dimensional point cloud with the estimated label 12J to which the estimated label is assigned for each of the supervoxels, and ends the present estimating processing routine.

Next, the structure of the deep neural network used in the deep neural network estimating unit 22 will be described with reference to FIG. 6 described above. The deep neural network estimating unit 22 obtains an estimation result label by processing the supervoxel data with a deep neural network constituted by the following layers (L1 to L9, L14). Note that the layers L1 to L9 are similar as the deep neural network described in the deep neural network learning unit 20 described above, and thus the repeated description thereof will be omitted.

(L1) positions input layer
(L2) geometric transformation network layer i
(L3) point_attributes input layer
(L4) mlp layer i
(L5) geometric transformation network layer ii
(L6) mlp layer ii
(L7) max pooling layer
(L8) supervoxel_attributes input layer
(L9) mlp layer iii
(L14) argmax layer In the argmax layer (L14), argmax processing is applied to 1×k-dimensional mlp_output_iii to obtain an index having a maximum value. This index is the estimated label.

Figure 10:
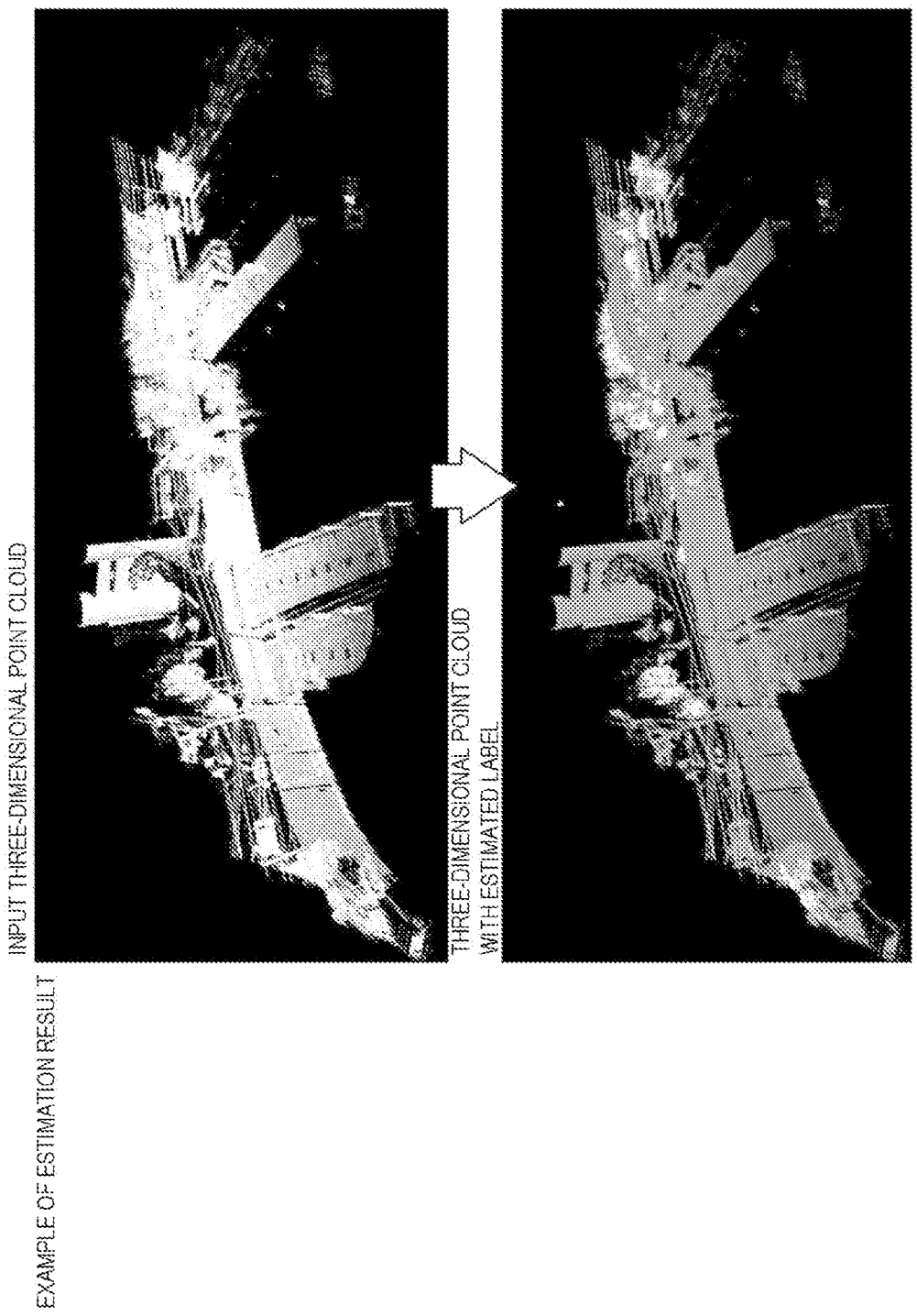
FIG. 10 is a diagram illustrating an example of an estimation result according to the embodiment.

As for the supervoxel data from which the estimated label is derived as described above, the estimated label is assigned to the constituent points. The similar processing is performed on all the supervoxel data, and a set of points to which the estimated label is assigned is output as the three-dimensional point cloud with the estimated label 12J. FIG. 10 illustrates an example of the estimation result according to the present embodiment. The example of the estimation result illustrated in FIG. 10 is actually illustrated as a color image, but is illustrated as a grayscale image for convenience in the present example.

The three-dimensional point cloud label learning apparatus and the three-dimensional point cloud label estimating apparatus have been described as an embodiment. The embodiment may be in the form of a program for causing a computer to function as each unit included in the three-dimensional point cloud label learning/estimating apparatus. The embodiment may be in the form of a computer-readable storage medium storing the program.

In addition, the configuration of the three-dimensional point cloud label learning/estimating apparatus described in the above embodiment is an example, and may be changed according to the situation without departing from the gist.

The processing procedure of the program described in the above embodiment is also an example, and unnecessary steps may be deleted, new steps may be added, or the processing order may be changed without departing from the gist of the program.

Further, in the above-described embodiment, a case has been described where the processing according to the embodiment is achieved by a software configuration using a computer by executing a program, but the present disclosure is not limited to this. The embodiment may be realized, for example, by hardware or a combination of hardware and software configurations.

REFERENCE SIGNS LIST

10 Three-dimensional point cloud label learning/estimating apparatus
10A Three-dimensional point cloud label learning apparatus
10B Three-dimensional point cloud label estimating apparatus
12 Storage unit
12A Three-dimensional point cloud
12B Ground surface height
12C Three-dimensional point cloud with ground-based height
12D Intensity-RGB converted three-dimensional point cloud with ground-based height
12E Point cloud label for learning
12F Clustering hyperparameter
12G Supervoxel data
12H Deep neural network hyperparameter
12I Learned deep neural network parameter
12J Three-dimensional point cloud with the estimated label
14 Ground-based height calculation unit
16 Intensity-RGB conversion unit
18 Supervoxel clustering unit
20 Deep neural network learning unit
22 Deep neural network estimating unit

The invention claimed is:

1. A computer-implemented method for processing labels of a three-dimensional point cloud, the method comprising:
   receiving a three-dimensional cloud, wherein the three-dimensional cloud includes a first three-dimensional position of a first point for learning and a first intensity value, wherein the first intensity value indicates a first reflection intensity at the first point for learning;
   generating, based on a combination of the three-dimensional cloud, cloud labels for learning and a clustering hyperparameter using the three-dimensional position, a plurality of supervoxels;
   generating the supervoxel data with correct labels for learning, wherein the supervoxel data with correct labels include, for each of the plurality of supervoxels: a three-dimensional position, an attribute of the three-dimensional position, a central position of the supervoxel and an attribute of the supervoxel;
   generating, using the supervoxel data with correct labels for learning and hyperparameters of a deep neural network for learning, deep neural network parameters of the deep neural network; and
   providing the generated deep neural network for estimating, based on the supervoxel data and a second point as a central position of the supervoxel, a second label at the second point in the three-dimensional cloud.

2. The computer-implemented method of claim 1, the method further comprising:
   receiving a first ground surface height;
   determining, based on the first ground surface height, a first ground-based height at the first point;
   generating the three-dimensional point cloud including the determined ground-based height;
   determining, based on the intensity value, a color value;
   generating, based at least on the generated three-dimensional cloud including the determined ground-based height with the color value, the three-dimensional point cloud including color values; and generating, based at least on the three-dimensional cloud including color values, cloud labels for learning and a clustering hyperparameter using the three-dimensional position including the color value, the plurality of supervoxels.

3. The computer-implemented method of claim 1, the method further comprising:

receiving a color value, wherein the color value represents a reflection intensity at the first point for learning;

generating, based at least on the generated three-dimensional cloud including the determined ground-based height with the color value, the three-dimensional point cloud including the color value; and generating, based at least on the three-dimensional cloud including the color value, cloud labels for learning and a clustering hyperparameter using the three-dimensional position including the color value, the plurality of supervoxels.

4. The computer-implemented method of claim 2, the method further comprising:

receiving a combination of a second three-directional position at a second point, a second intensity value indicating a second reflection intensity at the second point, and a second ground surface height; and determining, based on the received combination, a label for the second point using the generated deep neural network.

5. The computer-implemented method of claim 2, wherein the color value is relates to a Red-Green-Blue (RGB) value.

6. The computer-implemented method of claim 4, wherein the color value is relates to a Red-Green-Blue (RGB) value.

7. The computer-implemented method of claim 1, wherein the first ground surface height relates to a ground surface position labeled as a ground surface in the three-dimensional point cloud.

8. A system for processing labels of a three-dimensional point cloud, the system comprises:

a processor; and a memory storing computer-executable instructions that when executed by the processor cause the system to:

receive a three-dimensional cloud, wherein the three-dimensional cloud includes a first three-dimensional position of a first point for learning and a first intensity value, wherein the first intensity value indicates a first reflection intensity at the first point for learning;

generate, based on a combination of the three-dimensional cloud, cloud labels for learning and a clustering hyperparameter using the three-dimensional position, a plurality of supervoxels;

generate the supervoxel data with correct labels for learning, wherein the supervoxel data with correct labels include, for each of the plurality of supervoxels: a three-dimensional position, an attribute of the three-dimensional position, a central position of the supervoxel and an attribute of the supervoxel;

generate, using the supervoxel data with correct labels for learning and hyperparameters of a deep neural network for learning, deep neural network parameters of the deep neural network; and providing the generated deep neural network for estimating, based on the supervoxel data and a second point as a central position of the supervoxel, a second label at the second point in the three-dimensional cloud.

9. The system of claim 8, the computer-executable instructions when executed further causing the system to:

receive a first ground surface height;

determine, based on the first ground surface height, a first ground-based height at the first point;

generate the three-dimensional point cloud including the determined ground-based height;

determine, based on the intensity value, a color value;

generate, based at least on the generated three-dimensional cloud including the determined ground-based height with the color value, the three-dimensional point cloud including the color value; and generate, based at least on the three-dimensional cloud including the color value, cloud labels for learning and a clustering hyperparameter using the three-dimensional position including the color value, a plurality of supervoxels.

10. The system of claim 8, the computer-executable instructions when executed further causing the system to:

receive a color value, wherein the color value represents a reflection intensity at the first point for learning;

generate, based at least on the generated three-dimensional cloud including the determined ground-based height with the color value, the three-dimensional point cloud including the color value; and generate, based at least on the three-dimensional cloud including the color value, cloud labels for learning and a clustering hyperparameter using the three-dimensional position including the color value, the plurality of supervoxels.

11. The system of claim 9, the computer-executable instructions when executed further causing the system to:

receive a combination of a second three-directional position at a second point, a second intensity value indicating a second reflection intensity at the second point, and a second ground surface height; and determine, based on the received combination, a label for the second point using the generated deep neural network.

12. The system of claim 9, wherein the color value is relates to a Red-Green-Blue (RGB) value.

13. The system of claim 11, wherein the color value is relates to a Red-Green-Blue (RGB) value.

14. The system of claim 8, wherein the first ground surface height relates to a ground surface position labeled as a ground surface in the three-dimensional point cloud.

15. A computer-readable non-transitory recording medium storing computer-executable instructions that when executed by a processor cause a computer system to:

receive a three-dimensional cloud, wherein the three-dimensional cloud includes a first three-dimensional position of a first point for learning and a first intensity value, wherein the first intensity value indicates a first reflection intensity at the first point for learning;

generate, based on a combination of the three-dimensional cloud, cloud labels for learning and a clustering hyperparameter using the three-dimensional position, a plurality of supervoxels;

generate the supervoxel data with correct labels for learning, wherein the supervoxel data with correct labels include, for each of the plurality of supervoxels: a three-dimensional position, an attribute of the three-dimensional position, a central position of the supervoxel and an attribute of the supervoxel;

generate, using the supervoxel data with correct labels for learning and hyperparameters of a deep neural network for learning, deep neural network parameters of the deep neural network; and provide the generated deep neural network for estimating, based on the supervoxel data and a second point as a central position of the supervoxel, a second label at the second point in the three-dimensional cloud.

16. The computer-readable non-transitory recording medium of claim 15, the computer-executable instructions when executed further causing the system to:

receive a first ground surface height;

determine, based on the first ground surface height, a first ground-based height at the first point;

generate the three-dimensional point cloud including the determined ground-based height;

determine, based on the intensity value, a color value;

generate, based at least on the generated three-dimensional cloud including the determined ground-based height with the color value, the three-dimensional point cloud including the color value; and generate, based at least on the three-dimensional cloud including the color value, cloud labels for learning and a clustering hyperparameter using the three-dimensional position including the color value, the plurality of supervoxels.

17. The computer-readable non-transitory recording medium of claim 15, the computer-executable instructions when executed further causing the system to:

receive a color value, wherein the color value represents a reflection intensity at the first point for learning;

generate, based at least on the generated three-dimensional cloud including the determined ground-based height with the color value, the three-dimensional point cloud including the color value; and generate, based at least on a combination of the three-dimensional cloud including the color value, cloud labels for learning and a clustering hyperparameter using the three-dimensional position including the color value, the plurality of supervoxels.

18. The computer-readable non-transitory recording medium of claim 16, the computer-executable instructions when executed further causing the system to:

receive a combination of a second three-directional position at a second point, a second intensity value indicating a second reflection intensity at the second point, and a second ground surface height; and determine, based on the received combination, a label for the second point using the generated deep neural network.

19. The computer-readable non-transitory recording medium of claim 16, wherein the color value is relates to a Red-Green-Blue (RGB) value.

20. The computer-readable non-transitory recording medium of claim 18, wherein the color value is relates to a Red-Green-Blue (RGB) value.

* * * * *